UNITED STATES PATENT OFFICE.

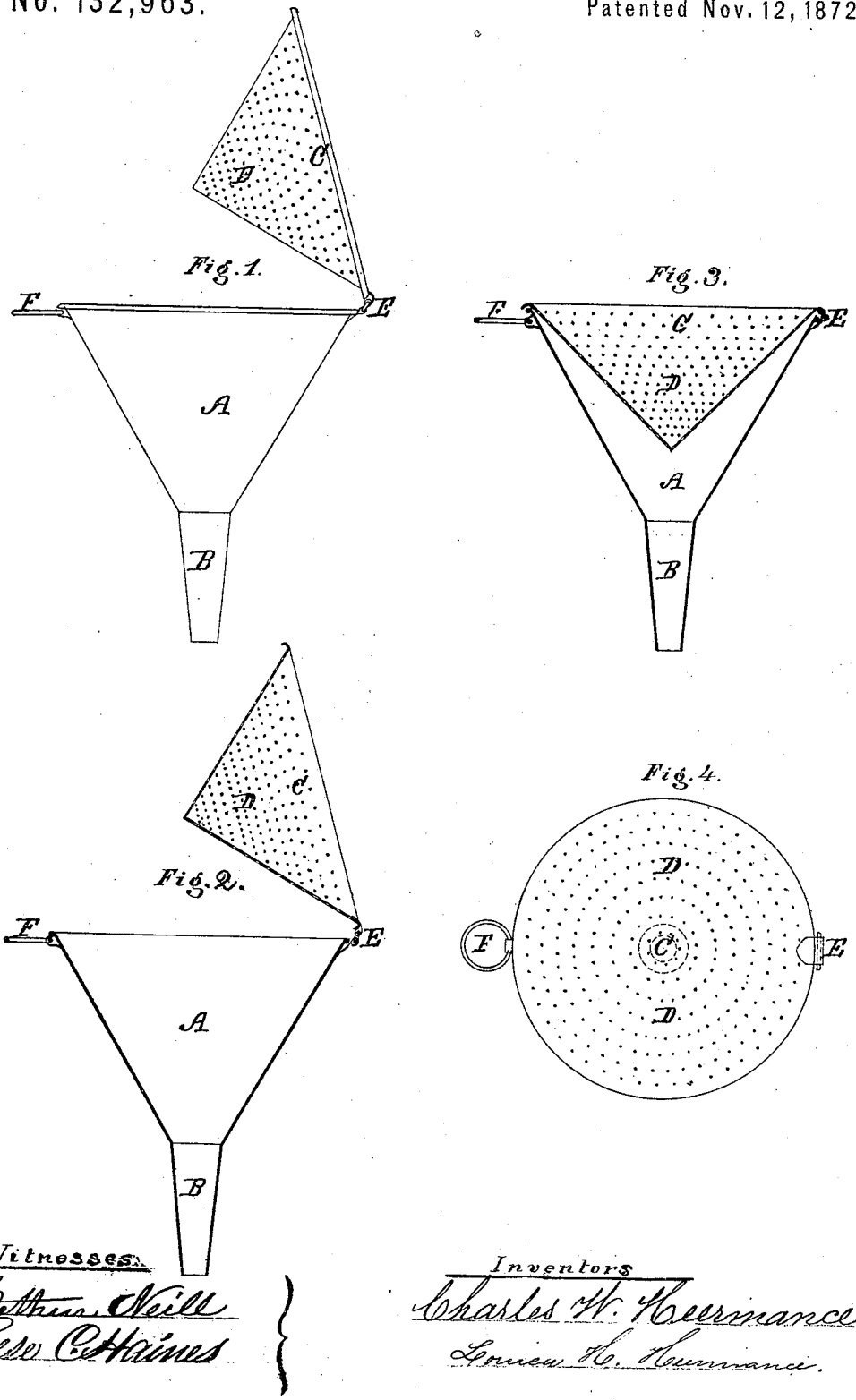

CHARLES W. HEERMANCE AND LOUISA H. HEERMANCE, OF NEW YORK, N. Y.

IMPROVEMENT IN STRAINERS AND FUNNELS COMBINED.

Specification forming part of Letters Patent No. 132,963, dated November 12, 1872.

*To all whom it may concern:*

Be it known that we, CHARLES W. HEERMANCE and LOUISA H. HEERMANCE, both of the city, county, and State of New York, have invented an Improved Combination of Strainer and Funnel for culinary and like purposes, of which the following is a specification:

The necessity for this invention has been long felt by persons employed in culinary duties. The strainer and funnel being separate, often the one may be found when the other could not, while the presence of both were requisite in pouring and at the same time straining water, milk, and other fluids for purposes of cooking and for the table. This want led us to design this invention; the nature of which consists in connecting, by a hinge-joint, two inverted hollow cones, which fold one within the other, the outer cone being provided with a discharge-pipe, and the inner a perforated hollow cone; or, in other words, a funnel and strainer, as shown in the drawing, in which—

Figure 1 represents the combined strainer and funnel, with the strainer raised for removing, by the faucet, sediments retained from the fluids passed through; Fig. 2, a sectional elevation of same; Fig. 3, a section, showing the strainer folded within the funnel when ready for use; and Fig. 4, a top view.

In the said drawing, A indicates the outer cone or funnel; B, the discharge-pipe; C, the inner cone or strainer; D, the perforations in said strainer, which may be made of metal, gauze-wire, or other suitable material; E, the hinge-joint uniting funnel and strainer; and F, a ring attached to the funnel for hanging the device in its place when not in use.

What we claim is—

The strainer C D and funnel A B, as combined, as an article of manufacture.

In testimony whereof we have hereunto set our signatures this 14th day of October, 1872.

CHARLES W. HEERMANCE.
LOUISA H. HEERMANCE.

Witnesses:
ARTHUR NEILL,
REESE C. HAINES.